US012681690B2

(12) United States Patent
Harada

(10) Patent No.: US 12,681,690 B2
(45) Date of Patent: Jul. 14, 2026

(54) IMAGE CAPTURE APPARATUS AND CONTROL METHOD

(71) Applicant: CANON KABUSHIKI KAISHA, Tokyo (JP)

(72) Inventor: Osamu Harada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 18/624,420

(22) Filed: Apr. 2, 2024

(65) Prior Publication Data

US 2024/0338172 A1　Oct. 10, 2024

(30) Foreign Application Priority Data

Apr. 4, 2023　(JP) ................................. 2023-060831

(51) Int. Cl.
　G06F 3/16　　　(2006.01)
　G03B 29/00　　(2021.01)
(52) U.S. Cl.
　CPC ............. G06F 3/167 (2013.01); G03B 29/00 (2013.01); G06F 3/162 (2013.01)
(58) Field of Classification Search
　CPC .......... G06F 3/167; G06F 3/162; G03B 29/00
　See application file for complete search history.

(56) References Cited

U.S. PATENT DOCUMENTS

| 2003/0081934 A1* | 5/2003 | Kirmuss | ................. B60R 11/02 |
| | | | 348/E7.086 |
| 2008/0059578 A1* | 3/2008 | Albertson | ............... G06F 3/016 |
| | | | 352/85 |
| 2015/0281832 A1* | 10/2015 | Kishimoto | ............ G06F 3/0304 |
| | | | 381/92 |
| 2016/0278091 A1* | 9/2016 | Wang | ..................... G06F 3/167 |

FOREIGN PATENT DOCUMENTS

JP　　　　2019126033 A　　7/2019

* cited by examiner

*Primary Examiner* — Abul K Azad
(74) *Attorney, Agent, or Firm* — Cowan, Liebowitz & Latman, P.C.

(57) ABSTRACT

An image capture apparatus comprises a detection unit that detects a radio signal, an extraction unit that extracts feature information of a subject from image data, a selection unit that selects a sound reception device that receives sound data from at least one sound transmission device from which the radio signal can be received, and a reception unit that receives, by a wireless communication unit, sound data from the selected sound transmission device selected by the selection unit. Based on a result of comparing feature information of a subject as a shooting target with comparison information for selecting the sound transmission device, the selection unit selects the sound transmission device that transmits sound data corresponding to the subject as the shooting target from at least one sound transmission device from which the radio signal can be received.

20 Claims, 6 Drawing Sheets

F I G. 1
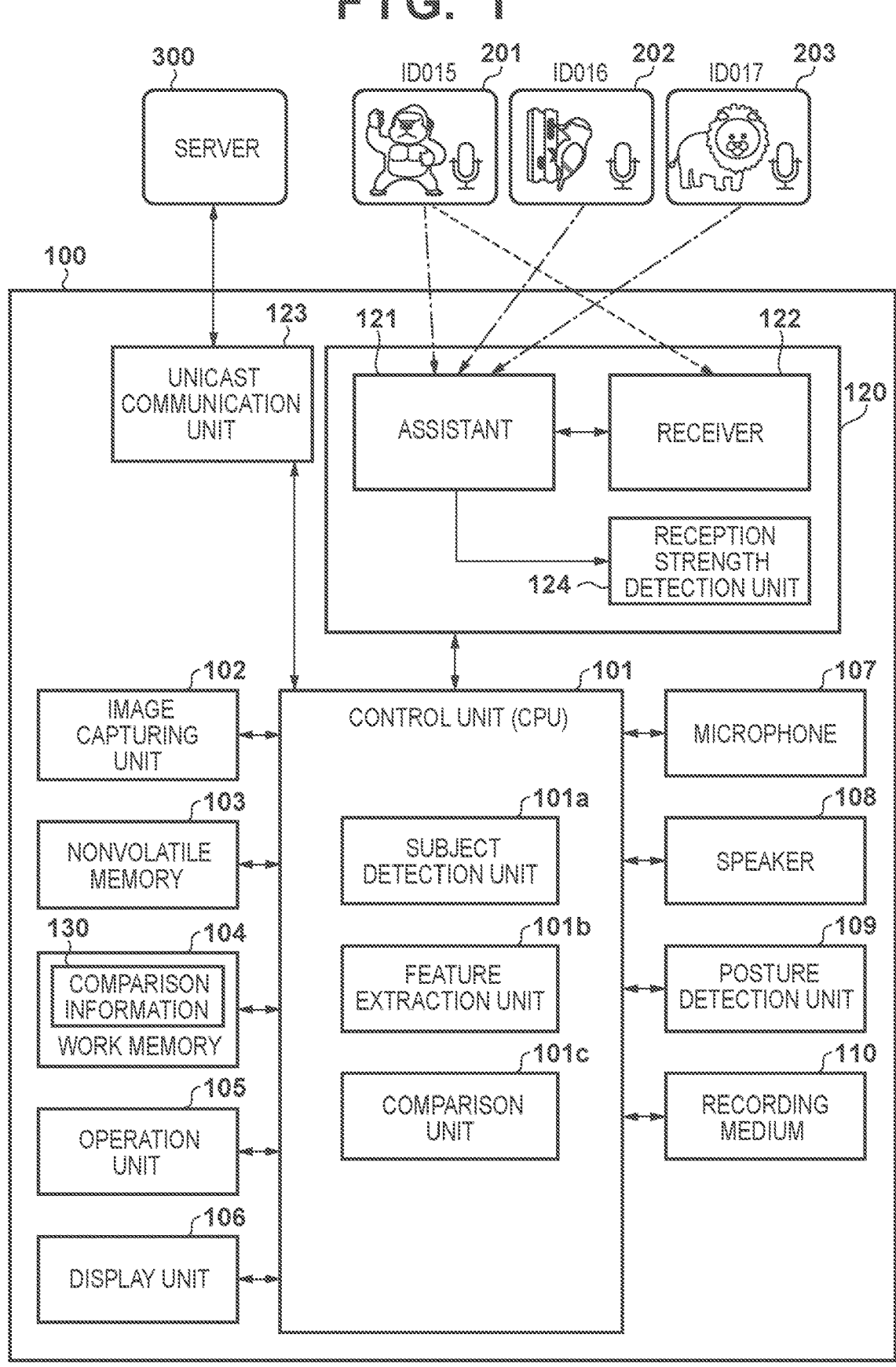

F I G. 2

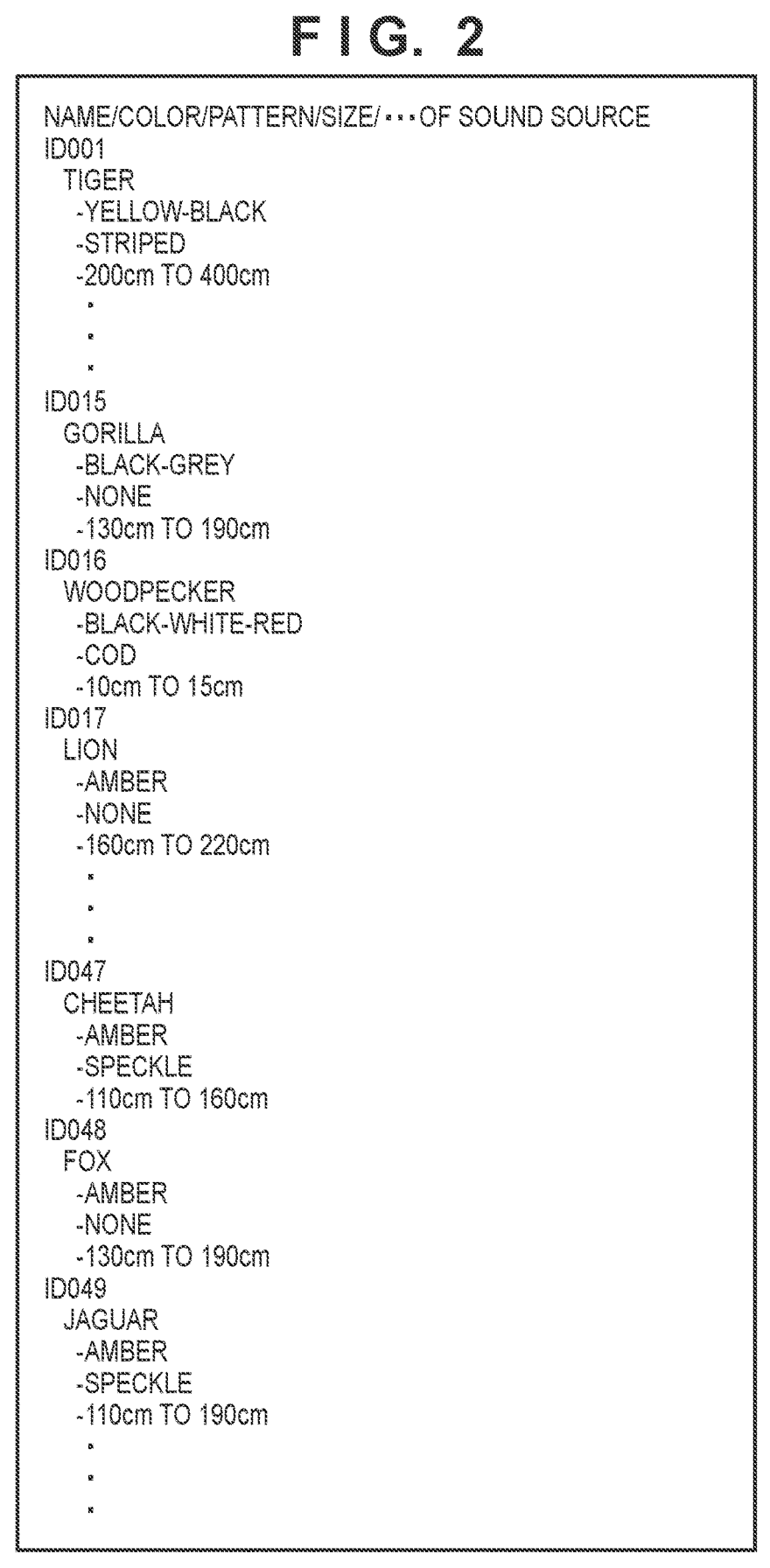

```
NAME/COLOR/PATTERN/SIZE/···OF SOUND SOURCE
ID001
  TIGER
    -YELLOW-BLACK
    -STRIPED
    -200cm TO 400cm
       .
       .
       .
ID015
  GORILLA
    -BLACK-GREY
    -NONE
    -130cm TO 190cm
ID016
  WOODPECKER
    -BLACK-WHITE-RED
    -COD
    -10cm TO 15cm
ID017
  LION
    -AMBER
    -NONE
    -160cm TO 220cm
       .
       .
       .
ID047
  CHEETAH
    -AMBER
    -SPECKLE
    -110cm TO 160cm
ID048
  FOX
    -AMBER
    -NONE
    -130cm TO 190cm
ID049
  JAGUAR
    -AMBER
    -SPECKLE
    -110cm TO 190cm
       .
       .
       .
```

F I G. 4A
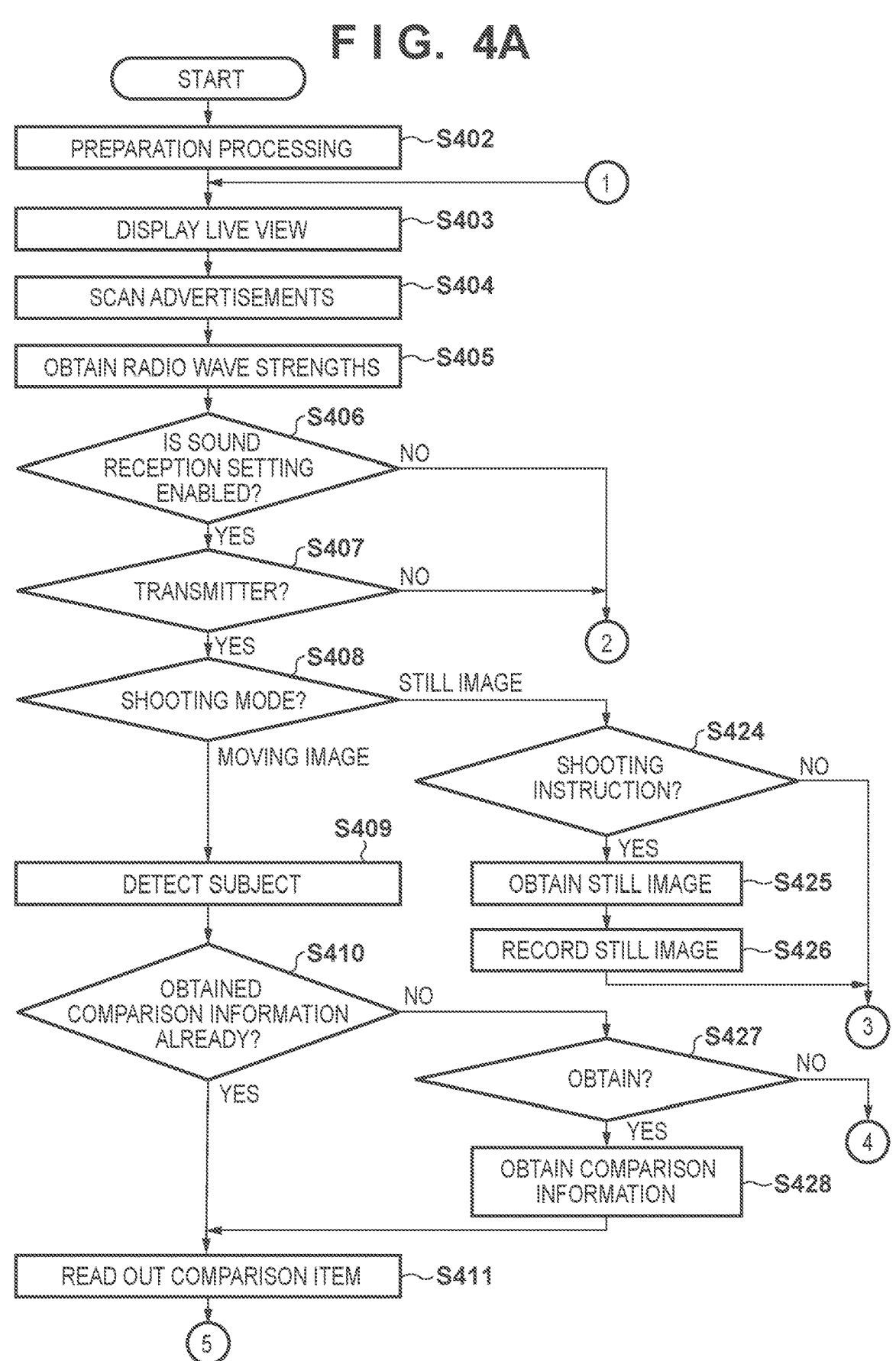

F I G. 4B

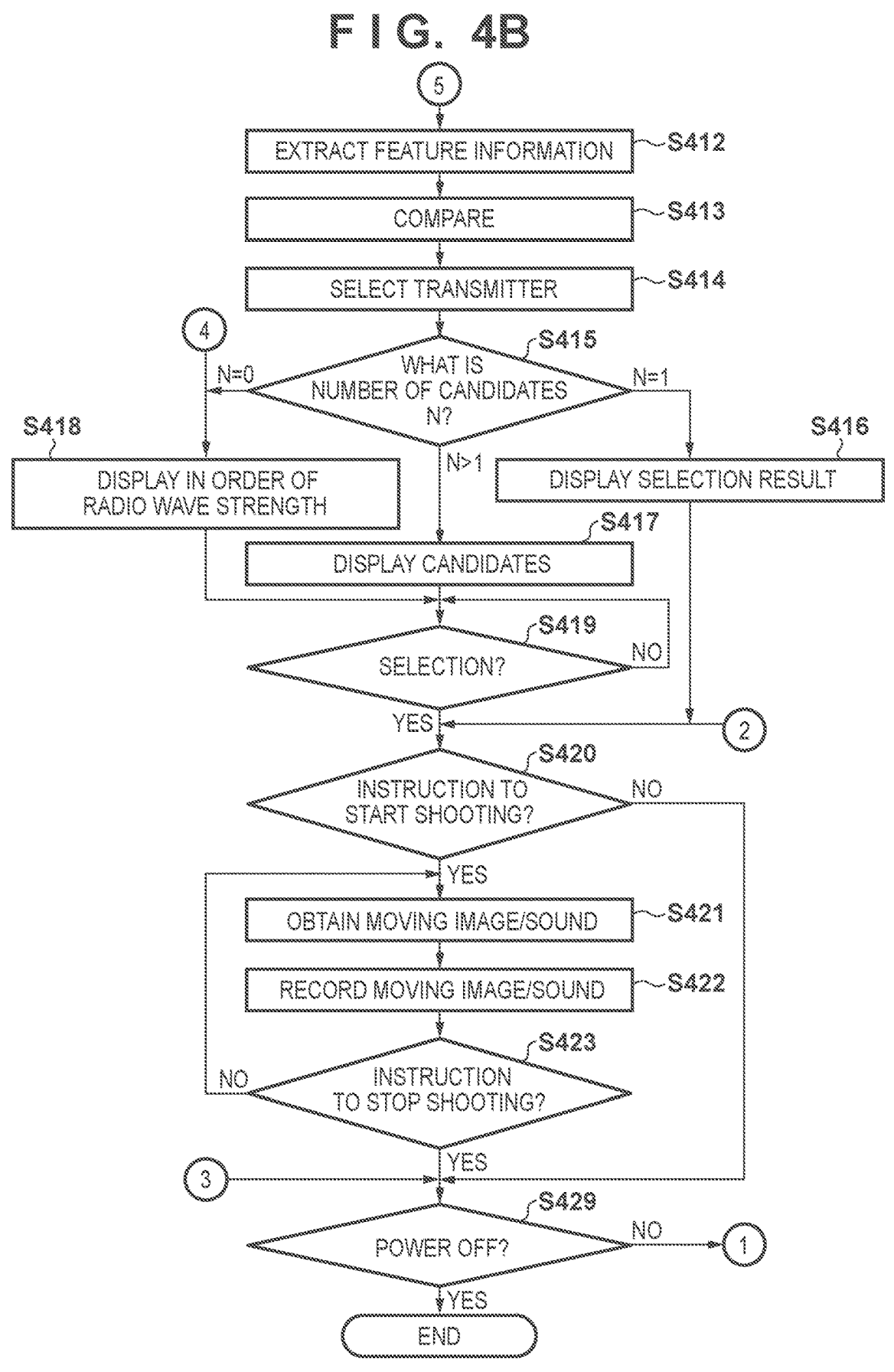

⑤

EXTRACT FEATURE INFORMATION —S412

COMPARE —S413

SELECT TRANSMITTER —S414

④

S415 — WHAT IS NUMBER OF CANDIDATES N?

N=0

N=1

N>1

S418 — DISPLAY IN ORDER OF RADIO WAVE STRENGTH

S416 — DISPLAY SELECTION RESULT

DISPLAY CANDIDATES —S417

S419 — SELECTION? — NO

YES ← ②

S420 — INSTRUCTION TO START SHOOTING? — NO

YES

OBTAIN MOVING IMAGE/SOUND —S421

RECORD MOVING IMAGE/SOUND —S422

S423 — INSTRUCTION TO STOP SHOOTING? — NO

YES

③

S429 — POWER OFF? — NO → ①

YES

END

SELECT TRANSMITTER

ID×××
ID○○○
ID△△△
ID◇◇◇

IMAGE CAPTURE APPARATUS AND CONTROL METHOD

BACKGROUND OF THE INVENTION

Field of the Invention

The present invention relates to a system capable of receiving sound data from a plurality of transmission devices.

Description of the Related Art

AURACAST® broadcast audio is a function of transmitting sound data from a single device such as s smartphone or a tablet to a plurality of user terminals and allowing a plurality of users to listen to the sound data received from the one device.

AURACAST® broadcast audio includes an AURACAST® Transmitter (to be referred to as a transmitter hereinafter), an AURACAST® Assistant (to be referred to as an assistant hereinafter), and an AURACAST® Receiver (to be referred to as a receiver hereinafter). The assistant scans advertisements broadcast from transmitters, and a user selects a desired transmitter from the scan result. The receiver receives sound data transmitted from the selected transmitter.

As assumed use cases of AURACAST® broadcast audio, a video on a monitor installed in a public area is viewed with sound, or an announcement in an airport or a station is directly received by a user terminal.

When a user terminal is a camera that shoots a still image or a moving image, and it shoots a moving image of a subject in a place apart from the photographer or a subject through glass, a microphone incorporated in the camera cannot collect sound around the subject. However, when a microphone and a transmitter are placed near the subject, and sound data transmitted from the transmitter is received by the camera, it is possible to shoot a high presence moving image with sound. As such a use case, for example, a theme park such as a zoo or an aquarium or an event such as a recital or an athletic meet is assumed.

Here, for example, assume a case where in a zoo, different kinds of animals are put in cages, a microphone and a transmitter are placed in each cage, and a camera includes an assistant and a receiver. In this case, the camera scans, by the assistant, advertisements broadcast from the transmitters placed in the cages, and a scan result is displayed as a list on the display of the camera, or the like. The photographer can select the transmitter placed in the cage of the subject as a shooting target from the scan result displayed in the list, and receive the sound data of the subject as a shooting target from the selected transmitter.

In the above-described example, the photographer can select the transmitter corresponding to the subject as a shooting target by a manual operation from the scan result obtained by the assistant, and receive sound data from the selected transmitter. However, the selection operation is cumbersome, and sound data may be received from a transmitter different from that of the subject as a shooting target due to an operation error. To solve this problem, a method is described in Japanese Patent Laid-Open No. 2019-126033, in which a plurality of transmitters each placed for an exhibit are arranged such that radio waves transmitted from the transmitters do not interfere with each other, and a user terminal receives sound data from a transmitter that has entered a range in which communication is possible.

However, in the method described in Japanese Patent Laid-Open No. 2019-126033, for example, when shooting a moving image of an animal in a zoo, when a photographer shoots an animal that is a shooting target from the front of the cage of an animal which is not the shooting target and whose cage is located at a position apart from the cage of the shooting target animal, sound data received from a transmitter is sound data received from a transmitter placed in the cage of the animal that is not the shooting target. That is, there is possibility that the sound data of the other subject that is not the shooting target is received for moving image data obtained by shooting the subject of the shooting target.

SUMMARY OF THE INVENTION

The present invention has been made in consideration of the aforementioned problems, and realizes techniques capable of obtaining sound data corresponding to a subject of a shooting target.

In order to solve the aforementioned problems, the present invention provides an image capture apparatus comprising: a detection unit that detects a radio signal transmitted from a sound transmission device; an extraction unit that extracts feature information of a subject from image data obtained by an image capturing unit; a selection unit that selects a sound reception device that receives sound data from at least one sound transmission device from which the radio signal can be received; and a reception unit that receives, by a wireless communication unit, sound data from the sound transmission device selected by the selection unit, wherein based on a result of comparing feature information of a subject as a shooting target with comparison information for selecting the sound transmission device, the selection unit selects the sound transmission device that transmits sound data corresponding to the subject as the shooting target from at least one sound transmission device from which the radio signal can be received.

In order to solve the aforementioned problems, the present invention provides a control method for an image capture apparatus, comprising: detecting a radio signal transmitted from a sound transmission device; extracting feature information of a subject from image data obtained by an image capturing unit; selecting a sound reception device that receives sound data from at least one sound transmission device from which the radio signal can be received; and receiving, by a wireless communication unit, sound data from the selected sound transmission device, wherein in the selecting, based on a result of comparing feature information of a subject as a shooting target with comparison information for selecting the sound transmission device, the sound transmission device that transmits sound data corresponding to the subject as the shooting target is selected from at least one sound transmission device from which the radio signal can be received.

According to the present invention, it is possible to obtain sound data corresponding to a subject of a shooting target.

Further features of the present invention will become apparent from the following description of exemplary embodiments (with reference to the attached drawings).

BRIEF DESCRIPTION OF THE DRAWINGS

FIG. 1 is a block diagram exemplarily showing an apparatus configuration according to the present embodiment;

FIG. 2 is a view exemplarily showing the data structure of comparison information according to the present embodiment;

FIGS. 4A and 4B are flowcharts showing control processing according to the present embodiment.

DESCRIPTION OF THE EMBODIMENTS

Figure 3A:
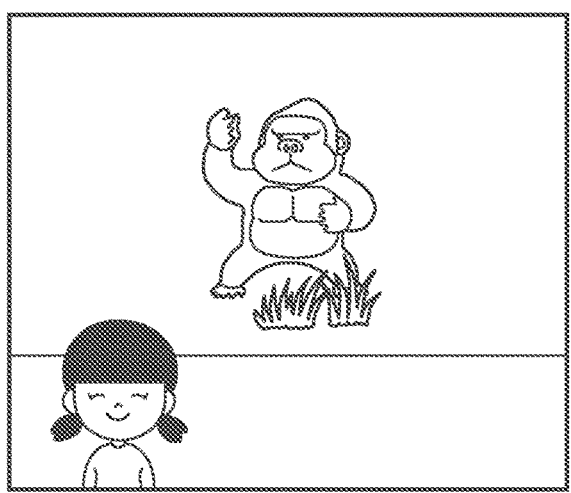
FIGS. 3A to 3D are views showing examples of display at the time of shooting according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

General Description

The outline of a system according to the present embodiment and a problem in a shooting scene will be described first.

The system according to the present embodiment includes a transmitter, an assistant, and a receiver in AURACAST® broadcast audio (to be referred to as AURACAST® hereinafter).

The transmitter broadcasts an advertisement and transmits sound data obtained by a microphone to the receiver. The transmitter is a sound transmission device connected to or incorporated in a device including a microphone.

The assistant transmits control information to the receiver and controls such that the receiver can receive sound data from the transmitter. The assistant and the receiver are paired by wired connection or wireless connection and are provided in the same device or different devices. The assistant is provided in a portable communication apparatus or information processing apparatus such as a smartphone or a table computer, or an image capture apparatus such as a digital camera. The receiver is a sound reception device provided in, for example, an acoustic device such as a headphone, an earphone, or a speaker or a recording apparatus that records sound.

A problem in a shooting scene according to the present embodiment will be described here.

Figures 5A, 5B:
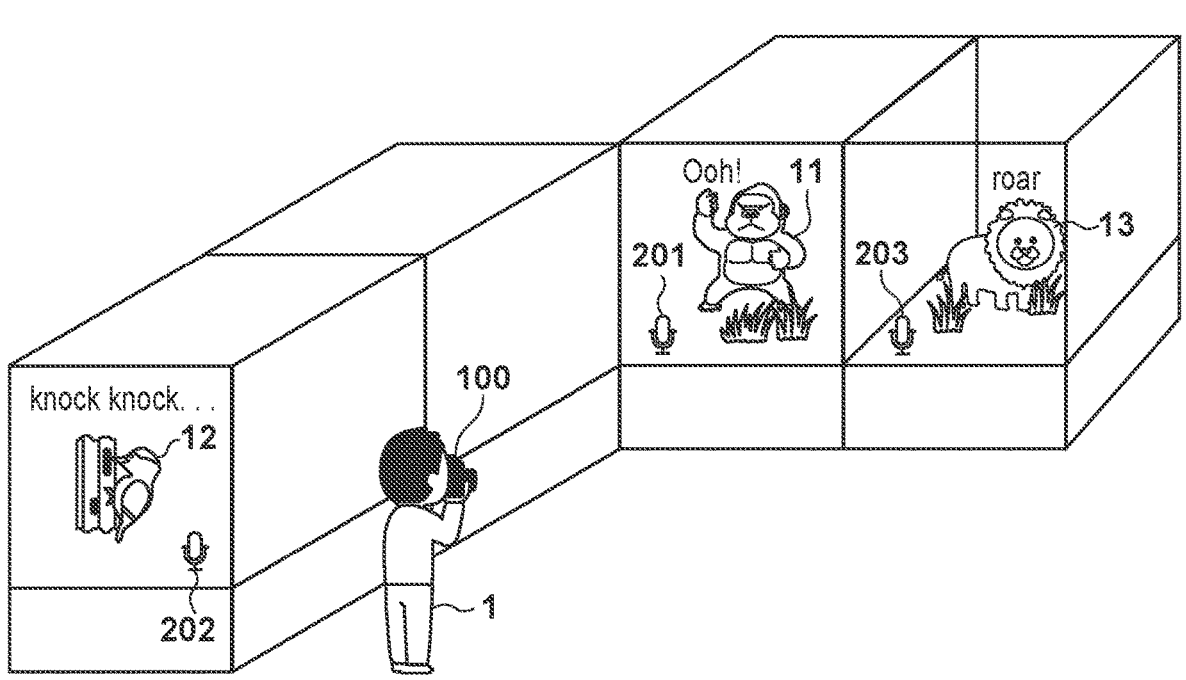
FIGS. 5A and 5B are views for explaining a problem in a shooting scene according to the present embodiment.

For example, assume a case where, in a zoo, as shown in FIG. 5A, a gorilla 11, a woodpecker 12, and a lion 13 are put in different cages with glass plates, microphones and transmitters 201, 202, and 203 are placed in the cages, and a camera 100 includes an assistant and a receiver.

In the camera 100, advertisements broadcast from the transmitters 201, 202, and 203 placed in the cages are scanned by the assistant of the camera 100. Then, as shown in FIG. 5B, the scan result is displayed as a list on the display of the camera 100, or the like. A photographer 1 can select the transmitter placed in the cage of the subject as a shooting target from the scan result displayed as a list, as shown in FIG. 5B, and receive, by the camera 100, the sound data of the subject as a shooting target transmitted from the selected transmitter.

In this case, the photographer 1 can select the transmitter corresponding to the subject as a shooting target by a manual operation from the scan result obtained by the assistant of the camera 100 and receive sound data from the selected transmitter. However, the selection operation is cumbersome, and sound data may be received from a transmitter different from that of the subject as a shooting target due to an operation error.

Also, as shown in FIG. 5A, when the photographer 1 shoots, by the camera 100, a moving image of the gorilla 11 from the front of the cage of the woodpecker 12, sound data received by the camera 100 is sound data transmitted from the transmitter 202 placed in the cage of the woodpecker 12. For this reason, the photographer 1 assumes that the subject as a shooting target is the gorilla 11, and sound data is a cry of the gorilla received from the transmitter 201 placed in the cage of the gorilla 11. However, sound data received by the camera 100 during shooting of the gorilla 11 is a cry of the woodpecker 12 received from the transmitter 202, resulting in sound mismatching to the subject as a shooting target.

Hence, in the present embodiment, when sound data can be received from the plurality of transmitters 201, 202, and 203, the transmitter corresponding to the subject as a shooting target is automatically selected. When the transmitter corresponding to the subject as a shooting target cannot be selected, one or more transmitters as candidates are selected and selectably displayed on a display or the like. The photographer selects a desired transmitter from the displayed candidates of transmitters, and the camera 100 receives sound data from the transmitter selected by the user.

In the present embodiment, a digital camera will be described as an example of the image capture apparatus, but it may be a portable device such as a smartphone, a tablet terminal, a smart watch, or a smartglass, or an information processing apparatus such as a personal computer capable of performing wireless communication.

Apparatus Configuration

First, the configuration and the function of the camera 100 according to the present embodiment will be described with reference to FIG. 1.

A control unit 101 is a central processing unit (CPU) that comprehensively controls the entire camera 100, and implements communication processing and control processing to be described later by executing programs stored in a nonvolatile memory 103 to be described later. Note that instead controlling the entire apparatus by the control unit 101, the entire apparatus may be controlled by causing a plurality of pieces of hardware to share the processing.

An image capturing unit 102 includes a lens group including a zoom lens and a focus lens, and a shutter having an aperture function. The image capturing unit 102 also includes an image capturing element formed by a CCD or a CMOS element, which converts a subject image into an electrical signal, and an A/D converter that converts an analog image signal output from the image capturing element into a digital signal. Under the control of the control unit 101, the image capturing unit 102 converts, by the image capturing element, subject image light whose image is formed by the lenses included in the image capturing unit 102 into an electrical signal, performs noise reduction processing or the like, and outputs image data formed by a digital signal.

The control unit 101 performs resize processing such as pixel interpolation and reduction or color conversion processing for image data captured by the image capturing unit 102. Also, the control unit 101 performs compression coding using JPEG or the like for still image data that has undergone image processing, or encodes moving image data by a moving image compression method such as MPEG2 or H.264, thereby generating an image file and recording it in a recording medium 110. In addition, the control unit 101 performs predetermined arithmetic processing using captured image data, and controls the focus lens, the aperture, and the shutter of the image capturing unit 102 based on the obtained arithmetic result, thereby perfuming auto-focus (AF) processing or auto-exposure (AE) processing.

The nonvolatile memory 103 is an electrically erasable/ recordable memory, and for example, an EEPROM or the like is used. The nonvolatile memory 103 stores constants, programs, and the like for the operation of the control unit 101. The program here is a program configured to execute control processing to be described later in the present embodiment.

A work memory 104 is used as a work area in which constants and variables for the operation of the control unit 101, and programs and the like read out from the nonvolatile memory 103 are deployed. Also, the work memory 104 is used as a buffer memory that temporarily holds image data captured by the image capturing unit 102 or an image display memory for a display unit 106.

An operation unit 105 is formed by operation members such as various kinds of switches, buttons, and dials that accept various kinds of operations from the user. The operation unit 105 includes, for example, a power button that turns on or off a power supply, a shooting button that instructs to start or end shooting of a still image or shooting of a moving image, a reproduction button that instructs reproduction of an image, and a mode switch button that changes the operation mode of the camera. The operation unit 105 also includes a dedicated connection button configured to start communication with an external apparatus such as a server 300 to be described later. Furthermore, the operation unit 105 includes a touch panel integrated with the display unit 106 to be described later.

In a mode of shooting a still image, the control unit 101 executes auto-focus (AF) processing or auto-exposure (AE) for image data captured by the image capturing unit 102. The control unit 101 then records, in the recording medium 110, the image data output from the image capturing unit 102 when the shooting button is operated.

In a mode of shooting a moving image, the control unit 101 starts shooting processing of moving image data when the shooting button is pressed for the first time, and continues the shooting processing of the moving image data until the shooting button is pressed again. Also, the control unit 101 stops the shooting processing of the moving image data when the shooting button is pressed again, and records, in the recording medium 110, the moving image data of the time from the start to the stop of the shooting processing. Furthermore, the control unit 101 can associate sound data received from a microphone 107 incorporated in the camera 100 or the transmitters 201, 202, and 203 during the shooting processing of the moving image data with the moving image data, and record a moving image file in the recording medium 110.

The transmitters 201, 202, and 203 each broadcast an advertisement and transmit sound data (or a sound file).

Note that sound data can also be obtained from a microphone device that is different from the microphone 107 and is connected as an external apparatus to the camera 100. Note that the microphone 107 and the microphone device different from the microphone 107 each output an analog sound signal or a digital sound signal.

The display unit 106 performs display of a live view image, display of a shot image, display of an image to be reproduced, and display of a Graphical User Interface (GUI) that accepts a user operation. The display unit 106 is, for example, a display device such as a liquid crystal display or an organic EL display. The display unit 106 may be integrated with the camera 100, or may be an external apparatus connected to the camera 100. The camera 100 need only be able to be connected to the display unit 106 and control display on the display unit 106.

The recording medium 110 records an image file generated by the control unit 101, or an image file already recorded in the recording medium 110 is read out by the control unit 101. The recording medium 110 may be a memory card or a hard disk drive attached to the camera 100, or may be a flash memory or a hard disk drive incorporated in the camera 100. The camera 100 need only be able to access at least the recording medium 110.

The camera 100 according to the present embodiment has a shooting mode of shooting image data, and a reproduction mode of reproducing an image file. In the shooting mode, image data captured by the image capturing unit 102 is displayed as a live view image on the display unit 106, and sound data received from the microphone 107 incorporated in the camera 100 or the transmitters 201, 202, and 203 is output from a speaker 108. In the reproduction mode, an image file recorded in the recording medium 110 is read out and displayed on the display unit 106. When it is a moving image file, sound data recorded in association with the moving image data is output from the speaker 108 in synchronism with the moving image data. Note that image files recorded in the recording medium 110 are not limited to image data shot by the camera 100 and may be, for example, image data shot by an external apparatus, or image data received from an external apparatus via a unicast communication unit 123 to be described later.

A posture detection unit 109 detects the motion (pan, tilt, raise, a still state, or the like) of the camera 100 using an acceleration sensor or a gyro sensor.

A sound reception unit 120 is a wireless communication module including an assistant 121, a receiver 122, and a reception strength detection unit 124.

The assistant 121 scans advertisements broadcast from the transmitters 201, 202, and 203. The assistant 121 transmits control information to the receiver 122 incorporated in the camera 100 and controls such that the receiver 122 can receive sound data from one of the transmitters 201, 202, and 203. The assistant 121 includes a communication interface complying with Bluetooth® or Bluetooth®-Low-Energy (to be referred to as BLE hereinafter).

The receiver 122 can receive sound data from one of the transmitters 201, 202, and 203 based on the control information received from the camera 100. The receiver 122 includes a communication interface complying with Bluetooth® or BLE. The sound data received by the receiver 122 is output to the control unit 101.

The control unit 101 executes predetermined sound processing for the sound data received by the receiver 122. Then, the control unit 101 displays the image data captured by the image capturing unit 102 as a live view image on the display unit 106, and outputs the sound data from the speaker 108 in synchronism with the live view image. The photographer can thus confirm the subject as a shooting target and the sound received from the transmitters 201, 202, and 203.

Also, in the reproduction mode, the control unit 101 reads out an image file from the recording medium 110, displays the image on the display unit 106, and outputs the sound from the speaker 108.

The unicast communication unit 123 is a wireless communication module including a communication interface configured to wirelessly communicate with an external apparatus such as the server 300. The camera 100 can transmit/receive data to/from an external apparatus via the unicast communication unit 123. The unicast communication unit 123 includes a wireless communication interface of, for example, Bluetooth®, BLE, wireless Local Area Network (LAN), 4GLTE, or 5G.

The reception strength detection unit 124 detects a radio wave strength when the assistant 121 receives advertisements from the transmitters 201, 202, and 203.

The control unit 101 includes a subject detection unit 101a, a feature extraction unit 101b, and a comparison unit 101c.

The subject detection unit 101a detects at least one subject from image data captured by the image capturing unit 102, and obtains type information (for example, an animal type) or position information of the detected subject.

The feature extraction unit 101b extracts feature information from the subject detected by the subject detection unit 101a. The extraction items of the feature information are defined by comparison information 130. The feature extraction unit 101b extracts the feature information of the subject based on the extraction items defined by the comparison information 130.

The comparison information 130 is sound source information including information that is a feature of sound data transmitted from a transmitter. The sound source is a generation source of sound, and may be an object that generates sound, a place that generates sound, or a medium in which sound is recorded. In the example shown in FIG. 5, the sound source is an animal such as the gorilla 11, the woodpecker 12, or the lion 13.

The comparison unit 101c compares the feature information of the subject extracted by the feature extraction unit 101b with the comparison items of the comparison information 130. Then, based on the comparison result, the comparison unit 101c selects one transmitter corresponding to the subject as a shooting target or a plurality of transmitters as candidates from one or more transmitters whose advertisements can be received by the assistant 121.

Here, in the present embodiment, a system configuration in which the camera 100 obtains sound data from the transmitters 201, 202, and 203 will be described.

FIG. 5A is a view exemplarily showing a scene in which in a zoo, a photographer shoots animals in cages from the outside.

The transmitter 201 is placed in the cage of the gorilla 11 and broadcasts an advertisement. Also, the transmitter 201 is connected to a microphone (not shown) and transmits sound data such as a cry of the gorilla 11 collected by the microphone to the camera 100.

The transmitter 202 is placed in the cage of the lion 13 and broadcasts an advertisement. Also, the transmitter 202 is connected to a microphone (not shown) and transmits sound data such as a cry of the lion 13 collected by the microphone to the camera 100.

The transmitter 203 is placed in the cage of the woodpecker 12 and broadcasts an advertisement. Also, the transmitter 203 is connected to a microphone (not shown) and transmits sound data such as a cry of the woodpecker 12 collected by the microphone.

The transmitters 201, 202, and 203 are assigned information for identifying these. In the present embodiment, it is assumed that as identification information, ID015 is assigned to the transmitter 201, ID016 is assigned to the transmitter 202, and ID017 is assigned to the transmitter 203. The transmitters 201 to 203 each broadcast an advertisement. The advertisement is a radio signal including presence and name in AURACAST®, the identification information of the transmitter, content, and a codec configuration.

The control unit 101 executes scan of the advertisement broadcast from each transmitter by the assistant 121 in the sound reception unit 120.

The control unit 101 displays a transmitter whose advertisement can be received as a scan result on the display unit 106. Viewing the scan result displayed on the display unit 106, the photographer 1 can confirm transmitters from which sound data can be received.

In the present embodiment, it is assumed that the assistant 121 can receive the advertisements of all the transmitters 201, 202, and 203.

The contents of the advertisements that the assistant 121 receives from the transmitters 201, 202, and 203 are stored in the work memory 104.

The control unit 101 detects, by the reception strength detection unit 124, the radio wave strength when the assistant 121 receives advertisements from the transmitters 201, 202, and 203. The radio wave strength is used to estimate the distance from the camera 100 to a transmitter. As the radio wave strength is high, the distance is short. As the radio wave strength is low, the distance is long. The sound reception unit 120 outputs, to the control unit 101, information that associates the radio wave strength of the detection target with a transmitter. The control unit 101 stores, in the work memory 104, the information received from the sound reception unit 120, which associates the radio wave strength with a transmitter.

In the present embodiment, when, to receive sound data from a transmitter, the photographer 1 sets the camera 100 to enable reception of sound data, the receiver 122 receives sound data from the transmitter.

The receiver 122 is paired with the assistant 121 by wired connection or wireless connection and can transmit/receive data. In the present embodiment, the receiver 122 and the assistant 121 are connected by wire. The receiver 122 provides necessary information to the assistant 121 to allow the assistant 121 to receive sound data transmitted from one of the transmitters 201, 202, and 203. The assistant 121 can thus receive sound data from the transmitters 201, 202, and 203 based on the information provided from the receiver 122.

Note that in the present embodiment, the assistant 121 and the receiver 122 are separated. However, the present invention is not limited to this, and these may be integrally formed to integrate the function of the assistant 121 into the receiver 122 or reversely integrate the function of the receiver 122 into the assistant 121.

The receiver 122 can receive sound data from only one of the plurality of transmitters whose advertisements can be received by the assistant 121. Hence, the control unit 101 needs to automatically select one of the transmitters 201, 202, and 203 whose advertisements can be received by the assistant 121 or select one or more candidates therefrom.

The data structure of the comparison information 130 will be described here.

The comparison information 130 is information that the camera 100 obtains from an external apparatus, and is stored in, for example, the server 300 managed by the zoo. The photographer 1 operates the camera 100, and the unicast communication unit 123 obtains the comparison information 130 from the server 300. The control unit 101 stores, in the work memory 104, the comparison information 130 obtained from the server 300. Note that the method of obtaining the comparison information 130 is not limited to the above-described method and, for example, it may be downloaded from the homepage of the zoo via the Internet, or may be obtained by another method.

Note that in the present embodiment, an example in which the comparison information 130 is held in an external apparatus such as the server 300 has been described. However, the transmitters 201, 202, and 203 may transmit the comparison information 130 added to advertisements.

FIG. 2 is a view exemplarily showing the data structure of the comparison information 130.

In the comparison information 130, one or more comparison items that are the features of a sound source are defined at the top of the data. In the example shown in FIG. 2, comparison items such as "name", "color", "pattern", and "size" of the sound source are defined.

In the next data, detailed sound source information for each comparison item of the sound source is written in correspondence with the identification information of each transmitter. In the example shown in FIG. 2, as the comparison items for the transmitter with the identification information ID001, pieces of information including sound source name "tiger", color "yellow and black", pattern "striped", and size "200 to 400 cm" are written. Sound source information such as a sound source name, a color, a pattern, and a size are similarly written for the identification information of other transmitters.

Referring back to FIG. 1, items to be extracted by the feature extraction unit 101b are the items defined by the comparison information 130.

Concerning the extraction items, the control unit 101 causes the feature extraction unit 101b to analyze, by image processing using, for example, artificial intelligence (AI), an image obtained by shooting a subject, thereby identifying the subject and extracting feature information.

Transmitter Selection Method

A method of selecting one appropriate transmitter or a plurality of transmitters serving as candidates from one or more transmitters whose advertisements can be received by the assistant 121, based on the result of comparison by the comparison unit 101c between the feature information of the subject extracted by the feature extraction unit 101b and the comparison items of the comparison information 130, will be described next with reference to FIGS. 3A to 3D.

Note that in the explanation of FIGS. 3A to 3D, it is assumed that the camera 100 has already obtained the comparison information 130 from the server 300 and stored it in the work memory 104.

First, the subject detection unit 101a detects two subjects from image data (live view image) in a shooting angle of view shown in FIG. 3A. Next, concerning the two subjects detected by the subject detection unit 101a, the feature extraction unit 101b extracts feature information for each comparison item of the comparison information 130. In the example shown in FIG. 3A, both the two subjects detected by the subject detection unit 101a face the front, and the feature extraction unit 101b obtains feature information "human" and "gorilla" as a feature extraction result. The comparison unit 101c compares the feature extraction result obtained by the feature extraction unit 101b with the comparison items of the comparison information 130. In the example shown in FIG. 5, transmitters from which sound data are received are transmitters whose advertisements can be received by the assistant 121. For this reason, the comparison targets of the comparison information 130 are only the identification information ID015, ID016, and ID017 of transmitters. The comparison unit 101c reads out identification information included in each advertisement that can be received by the assistant 121, and compares the readout identification information with the identification information of transmitters corresponding to a human and a lion that are the sound source names as comparison items of the comparison information 130. The comparison unit 101c then obtains a comparison result that, of the feature extraction result, the human does not match any of the comparison items, and the gorilla matches ID015 but not ID016 and ID017. In this way, the comparison unit 101c selects the transmitter 201 as the transmitter, whose identification information matching the feature extraction result is ID015 and which receives sound data corresponding to the subject as a shooting target.

The control unit 101 outputs the transmitter selection result by the comparison unit 101c to the assistant 121. Based on the transmitter selection result, the assistant 121 transmits, to the receiver 122, control information that enables reception of sound data from the selected transmitter 201. The receiver 122 can receive sound data from the transmitter 201 based on the control information received from the assistant 121.

The sound data received by the receiver 122 is output to the control unit 101, and the control unit 101 executes sound processing for the sound data. The control unit 101 displays a moving image on the display unit 106 and outputs sound to the speaker 108 in synchronism with the image data obtained by the image capturing unit 102. The photographer can confirm the moving image on the display unit 106 and confirm the sound through the speaker 108.

When the photographer 1 operates the shooting button of the operation unit 105, and the camera 100 accordingly starts moving image shooting, the control unit 101 performs moving image display on the display unit 106 and sound output from the speaker 108 and simultaneously executes record processing of recording the moving image and sound of a predetermined file format in the recording medium 110.

Figure 3B:
Figure 3B:
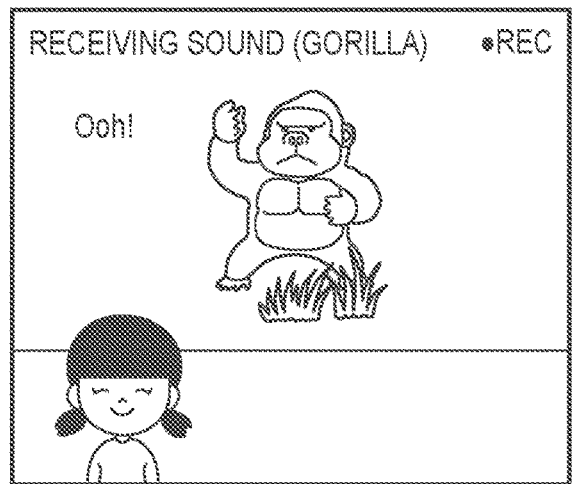

Also, the control unit 101 displays, on the display unit 106, a message indicating that sound data is being received, as shown in FIG. 3B. In this case, even when the identification information of the transmitter is displayed, the photographer 1 cannot discriminate whether sound data corresponding to the subject as a shooting target is being received. Hence, in the example shown in FIG. 3B, the sound source name or the like that allows the photographer 1 to identify that the sound data corresponding to the subject as a shooting target is being received is displayed. By using the information of the comparison item of the comparison information 130, the photographer 1 can identify that the sound data corresponding to the subject as a shooting target is being received. In the example shown in FIG. 3B, as the display form of the transmitter from which the sound data is being received, "gorilla" that is the name of the sound source of identification information ID015 is displayed.

In this way, in the control unit 101, the subject detection unit 101a performs subject detection for image data captured by the image capturing unit 102, and the feature extraction unit 101b extracts feature information from the detected subject. The comparison unit 101c compares the extracted feature information of the subject with a comparison item of the comparison information 130. In accordance with the comparison result, the control unit 101 can automatically select one transmitter that transmits sound data corresponding to the subject as a shooting target from one or more transmitters whose advertisements are received by the assistant 121.

In the example shown in FIG. 3A, both the subjects detected from the image data in the shooting angle of view face the front, and the type of each subject (in the present embodiment, the name of each subject) can easily be specified by minimum feature information. However, animals put in cages in the zoo do not necessarily stand still, and do not necessarily face the front with respect to the photographer 1. Also, in a case as well where animals put in the cages in which one or more transmitters whose advertisements can be received by the assistant 121 are placed have similar features, it is not easy to select the transmitter corresponding to the subject as a shooting target and receive sound data.

Figure 3C:
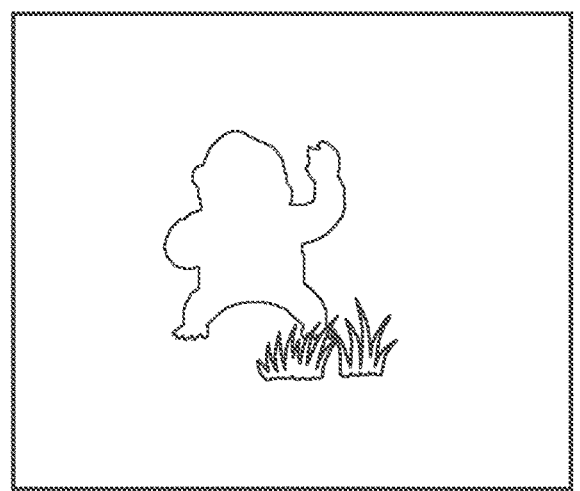

FIG. 3C is a view for explaining a transmitter selection method in a case where the subject as a shooting target is a moving body and does not face the front with respect to the photographer, or the features of animals are similar.

In the example shown in FIG. 3A, the transmitters 201, 202, and 203 are assumed to be the transmitters whose advertisements can be received by the assistant 121.

In the example shown in FIG. 3C, since the gorilla is with its back to the camera 100 in the image data in the shooting angle of view, it is difficult for the feature extraction unit 101b to extract feature information by the sound source name as a comparison item of the comparison information 130. In this case, feature information is extracted for the comparison items of the comparison information 130 other than the sound source name, and the transmitters to be selected are narrowed down. The comparison items other than the sound source name include at least one of color, pattern, and size shown in FIG. 2.

First, narrowing is performed for colors. Since the subject color is black, the identification information ID017 of the transmitter placed in the cage of the lion whose subject color is brown is non-appropriate. Next, narrowing is performed for the size of the subject. Since the size of the subject is 100 cm or more, the identification information ID016 of the transmitter placed in the cage of the woodpecker whose size is about 15 cm is non-appropriate. Narrowing is performed in this way, and the comparison unit 101c determines that the comparison information 130 that matches the feature extraction result is the identification information ID015 of the transmitter placed in the cage of the gorilla, and outputs the transmitter 201 corresponding to the identification information ID015 as the selection result.

A case where the transmitters whose advertisements can be received by the assistant 121 have similar comparison items of the comparison information 130 will be described next.

In this case, unlike the shooting scene shown in FIG. 5A, it is assumed that the transmitters whose advertisements can be received by the assistant 121 are placed in the cages of a cheetah, a fox, and a jaguar, and the subject as a shooting target is the cheetah. When the animal existing in the image data in the shooting angle of view shows its back, it is difficult for the feature extraction unit 101b to specify, by the name, the animal in the image in the shooting angle of view as the cheetah. As for other features, the color is close to those of all animals, and the size and the pattern are close to those of the jaguar. For this reason, it is difficult to specify, by these comparison items, the animal as the cheetah.

Figure 3D:
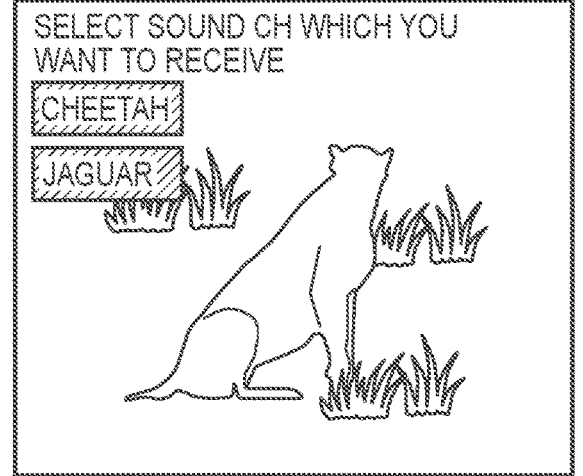

Hence, it is unable to select one transmitter corresponding to the subject as a shooting target from the transmitters whose advertisements can be received by the assistant 121. In such a case, as shown in FIG. 3D, the comparison unit 101c selects one or more transmitters serving as candidates from the transmitters whose advertisements can be received by the assistant 121. The selected transmitter candidates are displayed on the display unit 106. The photographer 1 can select a desired transmitter from the transmitter candidates. In this way, the selection operation of the photographer 1 can be facilitated by narrowing down and displaying selectable candidates, instead of displaying, on the display unit 106, all transmitters whose advertisements can be received by the assistant 121.

Note that when narrowing of transmitters by the comparison unit 101c is impossible, all transmitters whose advertisements can be received are selectably displayed based on the radio wave strength of the advertisement for each transmitter stored in the work memory 104. For example, the transmitters are displayed on the display unit 106 sequentially in the descending order of radio wave strengths to allow the photographer 1 to select a desired transmitter. Note that the descending order of radio wave strengths is synonymous with the ascending order of distances from the camera 100 to the transmitters.

Control Processing

Control processing by the camera 100 according to the present embodiment will be described next with reference to FIGS. 4A and 4B.

Note that the processing shown in FIGS. 4A and 4B ae implemented when the control unit 101 of the camera 100 executes a program stored in the nonvolatile memory 103 and controls the components of the camera 100. Also, the processing shown in FIGS. 4A and 4B is started when the power button of the camera 100 is pressed.

In step S402, the control unit 101 activates the components of the camera 100 including the image capturing unit 102.

In step S403, the control unit 101 displays, on the display unit 106, a live view image sequentially captured by the image capturing unit 102. The live view image is continuously displayed on the display unit 106 unless the photographer 1 operates the operation unit 105 to switch the display target on the display unit 106.

In step S404, the control unit 101 scans, by the assistant 121, external devices that transmit advertisements, and stores at least one external device whose advertisement can be received as a scan result in the work memory 104. The external devices whose advertisements can be received by the assistant 121 include devices other than transmitters. In the present embodiment, however, to facilitate the explanation, it is assumed that only advertisements transmitted from transmitters can be received. Hence, in the present embodiment, all external devices whose advertisements can be received by the assistant 121 are transmitters.

In step S405, the control unit 101 detects, by the reception strength detection unit 124, the radio wave strengths of the advertisements that can be received in step S404. The reception strength detection unit 124 outputs the radio wave strength of the advertisement detected for each transmitter to the control unit 101, and the control unit 101 associates the radio wave strengths of the advertisements of the transmitters with each other and stores these in the work memory 104.

In step S406, the control unit 101 determines whether the camera 100 is going to receive sound data from a transmitter. Upon determining that the camera 100 is going to receive sound data, the control unit 101 advances the process to step S407. Upon determining that the camera 100 is not going to receive sound data, the control unit 101 advances the process to step S420.

Whether the camera 100 is going to receive sound data from a transmitter is determined in the following way. For example, the user can set reception of sound data from a transmitter to "enabled" or "disabled" by operating a GUI displayed on the display unit 106 of the camera 100. When reception of sound data is set to "enabled", the control unit 101 controls to receive only sound data from an automatically or manually selected transmitter or receive sound data from the transmitter and sound data of the microphone 107. When reception of sound data is set to "disabled", the control unit 101 controls not to receive sound data from a transmitter but to receive only sound data of the microphone 107. When reception of sound data is set to "disabled", the user need not select a transmitter. Hence, the control unit 101 skips steps S407 to S419 that are processing of selecting a transmitter and advances the process to step S420.

In step S420, the control unit 101 determines whether the shooting button of the operation unit 105 is operated by the user, that is, transitions to a so-called moving image shooting wait state. In this case, only the sound data of the microphone 107 can be received.

In step S407, the control unit 101 determines whether at least one external device whose advertisement can be received by the assistant 121 is a transmitter. In the present embodiment, the external device whose advertisement can be received by the assistant 121 is a transmitter. Hence, the control unit 101 determines that the at least one external device whose advertisement can be received by the assistant 121 is a transmitter, and advances the process to step S408. Upon determining that the external device whose advertisement can be received by the assistant 121 is not a transmitter, since sound data cannot be received, the control unit 101 skips steps S407 to S419 that are processing of selecting a transmitter and advances the process to step S420. In this case, the control unit 101 receives only the sound data of the microphone 107. In step S407, when the external device whose advertisement can be received by the assistant 121 is not a transmitter, a message indicating that there exists no selectable transmitter is displayed on the display unit 106, thereby notifying the user that sound data from a transmitter cannot be received.

In step S408, the control unit 101 determines whether the shooting mode is "still image" or "moving image". For example, the user can set the shooting mode to "still image" or "moving image" by operating a GUI displayed on the display unit 106 of the camera 100. When the still image shooting mode is selected, sound data need not be received. For this reason, the control unit 101 advances the process to steps S424 to S426 that are processing of shooting a still image.

In step S424, the control unit 101 determines the state of the shooting button of the operation unit 105. Upon determining that the shooting button is on, the control unit 101 advances the process to step S425. Upon determining that the shooting button is off, the control unit 101 advances the process to step S429.

In steps S425 and S426, the control unit 101 obtains still image data by the image capturing unit 102 and records it in the recording medium 110.

When the moving image shooting mode is selected, the control unit 101 advances the process to step S409.

In step S409, the control unit 101 performs, by the subject detection unit 101a, subject detection processing for image data in the shooting angle of view. As for detected subjects, the feature extraction unit 101b extracts feature information for each subject. To extract feature information, the comparison items of the comparison information 130 are necessary.

In step S410, the control unit 101 determines the obtaining state of the comparison information 130. Upon determining that the comparison information 130 is already obtained, that is, the comparison information 130 is stored in the work memory 104, the control unit 101 advances the process to step S411.

In step S411, the control unit 101 reads out at least one comparison item from the comparison information 130.

Upon determining that the comparison information 130 is not obtained, that is, the comparison information 130 is not stored in the work memory 104, the control unit 101 advances the process to step S427.

In step S427, the control unit 101 displays, on the display unit 106, a message indicating that obtainment of the comparison information 130 is necessary, thereby making a notification to the user. When the user does not obtain the comparison information 130, the feature extraction unit 101b cannot extract feature information for each subject from the image data obtained by the image capturing unit 102. For this reason, at least one transmitter whose advertisement can be received by the assistant 121 cannot automatically be selected. Since the user sets reception of sound data from a transmitter to "enabled" in step S406, when at least one transmitter whose advertisement can be received by the assistant 121 exists, the information of the transmitter is displayed on the display unit 106. Hence, upon determining in step S407 that the external device whose advertisement can be received by the assistant 121 is a transmitter, the control unit 101 advances the process to step S418. In step S418, the control unit 101 displays the at least one transmitter whose advertisement can be received on the display unit 106 based on the descending order of radio wave strengths of the advertisements detected by the reception strength detection unit 124.

When the user obtains the comparison information 130 in step S427, the control unit 101 obtains, by the unicast communication unit 123, the comparison information 130 from the server 300 and stores it in the work memory 104 when the user operates the operation unit 105.

In step S428, the control unit 101 determines that obtainment of the comparison information 130 is completed, and advances the process to step S411.

In step S411, the control unit 101 reads out at least one comparison item from the comparison information 130.

In step S412, based on the at least one comparison item read out from the comparison information 130 in step S411, the control unit 101 extracts, by the feature extraction unit 101b, the feature information of the subject detected in step S409 for each comparison item.

In step S413, the control unit 101 compares the feature information of the subject extracted in step S412 with the comparison item of the comparison information 130.

In step S414, based on the comparison result in step S413, the control unit 101 selects from the at least one transmitter whose advertisement can be received by the assistant 121 one transmitter or one or more transmitter candidates corresponding to the subject as a shooting target.

In step S415, the control unit 101 determines the display form on the display unit 106 according to the transmitter candidate selected in step S414. When no transmitter candidate is found, that is, when the number N of candidates is 0, the control unit 101 advances the process to step S418.

In step S418, the control unit 101 displays all transmitters whose advertisements can be received by the assistant 121 on the display unit 106 in the descending order of radio wave strengths. In this case, since a transmitter cannot automatically be selected, the transmitters are displayed sequentially from the transmitter whose distance from the camera 100 is estimated to be close. The user can select one desired transmitter from the transmitter candidates displayed on the display unit 106.

When there are two or more transmitter candidates, that is, when candidates are found but cannot be narrowed down to one, the control unit 101 advances the process to step S417.

In step S417, the control unit 101 displays one or more transmitter candidates on the display unit 106. The user can select one desired transmitter from the transmitter candidates displayed on the display unit 106. In this case, the transmitter candidates may be displayed on the display unit 106 in an arbitrary order, or may be displayed in the descending order of radio wave strengths of advertisements, like a case where no transmitter serving as a candidate is found.

Also, when the transmitter candidates can be narrowed down to one, and this is the same as the previous transmitter candidate, the control unit 101 advances the process to step S416 to display the one selected transmitter on the display unit 106.

In step S419, the control unit 101 waits until the user selects a transmitter by operating the operation unit 105, and advances the process to step S420 in accordance with selection of the transmitter.

In step S420, the control unit 101 determines whether to start moving image shooting. Upon determining that the shooting button is operated by the user from the moving image shooting wait state, the control unit 101 advances the process to step S421. Upon determining that the shooting button is not operated by the user, the control unit 101 advances the process to step S429.

In steps S421 and S422, the control unit 101 starts moving image shooting processing in accordance with the operation of the shooting button by the user, and records, in the recording medium 110, moving image data obtained from the image capturing unit 102 and sound data received from the transmitter in synchronism.

In step S423, the control unit 101 determines whether to stop moving image shooting. Upon determining that the shooting button is not operated by the user, the control unit 101 returns the process to step S421 to continue moving image shooting. Upon determining that the shooting button is operated by the user from the moving image shooting state, the control unit 101 advances the process to step S429.

In step S429, the control unit 101 determines whether the power button is turned off. Upon determining that the power button is not turned off, the control unit 101 returns the process to the shooting wait state in step S403. Upon determining that the power button is turned off, the control unit 101 ends the processing.

According to the present embodiment, in a state in which the camera 100 can receive sound data from a plurality of transmitters at the time of moving image shooting, feature information of a subject detected from image data in the shooting angle of view is compared with the comparison items of the comparison information 130. A transmitter corresponding to the subject as a shooting target can automatically be selected based on the comparison result.

When it is unable to automatically select a transmitter, at least one transmitter candidate narrowed down from the plurality of transmitters is selectably displayed. This makes it to possible to promote the user to select a desired transmitter from the transmitter candidates, and the user can easily select a desired transmitter from the transmitter candidates.

Note that in the processing shown in FIGS. 4A and 4B, a series of operations after the camera 100 is powered on until moving image shooting is executed after the shooting wait state has been described. The operation (steps S403 to S420) in the shooting wait state is repetitively executed.

Also, the shooting target is not limited to a stationary body and includes a moving body such as an animal. When the shooting target is a moving body, image data in the shooting angle of view changes every minute. In FIGS. 4A and 4B, for example, in the subject detection processing in step S409, change points of the current frame and those of the preceding frame are compared. When there is no change, it is determined that the state of the subject of the image data in the shooting angle of view is maintained, and the processing of steps S410 to S414 may be omitted.

When the subject in the shooting angle of view moves during shooting wait, the subject may sometimes be out of the shooting angle of view. In this case, the feature information of the subject before it is out of the shooting angle of view is compared with the comparison information. When a transmitter is already selected, the selection state of the transmitter is maintained. In this case, the subject was out of the shooting angle of view not because of change of the shooting range of the camera 100 by the photographer but because of movement of the subject. It is therefore determined that, for example, expecting that the subject out of the shooting angle of view returns into the shooting angle of view again, the photographer has a will to shoot the subject in the shooting range at the point of time when the subject was out of the shooting angle of view. Note that whether the subject was out of the shooting angle of view because of movement of the subject or because of change of the shooting range of the camera 100 by the photographer can be determined by the posture detection unit 109 provided in the camera 100. In a case where the subject was out of the shooting angle of view, when movement of the camera 100 is not detected by the posture detection unit 109, or when the moving amount of the camera 100 detected by the posture detection unit 109 is not a moving amount for making the subject out of the shooting angle of view, it can be determined that the cause is movement of the subject. To the contrary, in a case where the subject was out of the shooting angle of view, when the moving amount of the camera 100 detected by the posture detection unit 109 is a moving amount for making the subject out of the shooting angle of view, the selection state of the transmitter is canceled. It can be determined that the cause is movement of the camera 100. The posture detection unit 109 may be configured to detect the moving amount from the change amount between frames for each time of the image data obtained by the image capturing unit 102.

In a case where the subject was out of the shooting angle of view because of the change of the shooting range of the camera 100 by the photographer, when a transmitter is already selected by comparing the feature information of the subject before the subject is out of the shooting angle of view with the comparison information, the selection state of the transmitter is canceled when the subject out of the shooting angle of view does not return into the shooting angle of view within a predetermined time. The predetermined time is provided assuming a case where, for example, when the photographer tracks, by the camera 100, the subject that is a moving body, the subject cannot sufficiently be tracked and is out of the shooting angle of view.

According to the present embodiment, when sound data can be received from the plurality of transmitters 201, 202, and 203, a transmitter corresponding to the subject as a shooting target is automatically selected, or a plurality of transmitters that are candidates are selectably displayed on the display or the like. The user selects a desired transmitter from the displayed transmitter candidates, and the camera 100 receives sound data from the transmitter selected by the user. This makes it possible to obtain sound data corresponding to the subject as a shooting target.

OTHER EMBODIMENTS

When comparing the feature information of the subject with the comparison information by the comparison unit 101c, it is determined whether the feature information of the subject matches the comparison items. In this case, for example, a weight may be added in accordance with the degree of matching to each comparison item, and when the weight added to feature information, among the pieces of feature information of the subject, which matches or substantially matches a plurality of comparison items is large, the transmitter may be selected as a candidate.

Also, in the present embodiment, the camera 100 includes the assistant 121 and the unicast communication unit 123 configured to obtain the comparison information 130. These may be provided in, for example, a communication apparatus such as a smartphone or a tablet terminal different from the camera 100, which maintains pairing (wireless connection) with the camera 100 and can transmit/receive necessary information.

Also, in the according to the present embodiment, a scene in which the photographer shoots an animal in a cage in a zoo has been exemplified. However, the present invention is not limited to this, and the embodiment can also be applied to a scene in which the photographer shoots an athletic facility such as an athletics stadium or a baseball stadium. For example, in a scene in which the photographer shoots an athletics stadium, a transmitter that transmits sound data is placed in each game space, and a feature of the game space is set to comparison information, thereby implementing the same processing as in the present embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-060831, filed Apr. 4, 2023 which is hereby incorporated by reference herein in its entirety.

What is claimed is:

1. An image capture apparatus comprising:
a detection unit that detects a radio signal transmitted from a sound transmission device;
an extraction unit that extracts feature information of a subject from image data obtained by an image capturing unit;
a selection unit that selects a sound reception device that receives sound data from at least one sound transmission device from which the radio signal can be received; and
a reception unit that receives, by a wireless communication unit, sound data from the sound transmission device selected by the selection unit,
wherein based on a result of comparing feature information of a subject as a shooting target with comparison information for selecting the sound transmission device, the selection unit selects the sound transmission device that transmits sound data corresponding to the subject as the shooting target from at least one sound transmission device from which the radio signal can be received; and
wherein each sound transmission device that transmits sound data is associated with at least one subject.

2. The apparatus according to claim 1, wherein when it is unable to select, based on the result of comparison, one sound transmission device that transmits the sound data corresponding to the subject as the shooting target from the at least one sound transmission device from which the radio signal can be received, the selection unit selects not less than one sound transmission device serving as a candidate from the sound transmission device from which the radio signal can be received.

3. The apparatus according to claim 2, wherein the selection unit selectably displays the not less than one sound transmission device serving as the candidate.

4. The apparatus according to claim 2, further comprising a reception strength detection unit that detects a radio wave strength when the radio signal is received,
wherein the selection unit displays the not less than one sound transmission device serving as the candidate in an order based on the radio wave strength.

5. The apparatus according to claim 4, wherein as the radio wave strength of the radio signal is higher, a distance from the image capture apparatus to the sound transmission device is shorter.

6. The apparatus according to claim 2, wherein when it is unable to select the not less than one sound transmission device serving as the candidate, the selection unit selectably displays all sound transmission devices from which the radio signal can be received.

7. The apparatus according to claim 6, wherein the selection unit displays all the sound transmission devices from which the radio signal can be received in an order based on a radio wave strength of the radio signal.

8. The apparatus according to claim 1, wherein the selection unit selects the sound transmission device in a mode of shooting a moving image, and the image capture apparatus includes a recording unit that records moving image data and the sound data received from the sound transmission device in association with each other.

9. The apparatus according to claim 1, wherein the selection unit does not select the sound transmission device in a mode of shooting a still image.

10. The apparatus according to claim 1, wherein in a state in which one sound transmission device that transmits the sound data corresponding to the subject as the shooting target is selected, when the subject as the shooting target is out of a shooting range because of movement of the subject as the shooting target, the selection unit maintains a selection state of the sound transmission device.

11. The apparatus according to claim 1, wherein in a state in which one sound transmission device that transmits the sound data corresponding to the subject as the shooting target is selected, when the subject as the shooting target is out of a shooting range because of movement of the image capture apparatus, and the subject as the shooting target does not return into the shooting range within a predetermined time, the selection unit cancels a selection state of the sound transmission device.

12. The apparatus according to claim 1, further comprising a communication unit that communicates with an external apparatus different from the sound transmission device, wherein the selection unit obtains the comparison information from the external apparatus by the communication unit.

13. The apparatus according to claim 1, wherein the radio signal includes the comparison information.

14. The apparatus according to claim 1, wherein the comparison information includes, for each identification information of the sound transmission device, a comparison item representing a feature of a sound source of sound data transmitted from the sound transmission device, and the selection unit selects a sound transmission device corresponding to identification information for which the feature information of the subject as the shooting target and the comparison item of the comparison information match.

15. The apparatus according to claim 1, wherein the comparison information includes, for each identification information of the sound transmission device, a comparison item representing a feature of a sound source of sound data transmitted from the sound transmission device, a weight is added to the feature information of the subject in accordance with a degree of matching to the comparison item of the comparison information, and the selection unit selects a candidate of the sound transmission device based on the weight added to the feature information of the subject.

16. The apparatus according to claim 1, wherein the detection unit and the wireless communication unit each include a communication interface complying with Bluetooth® or Bluetooth®-Low-Energy, and the sound transmission device, the detection unit, and the reception unit are a transmitter, an assistant, and a receiver in AURACAST® broadcast audio, respectively.

17. The apparatus according to claim 1, wherein the comparison information includes feature information corresponding to at least one subject.

18. The apparatus according to claim 17, wherein the selection unit selects the sound transmission device based on the result of comparing the feature information extracted from the image data and the feature information included in the comparison information.

19. A control method for an image capture apparatus, comprising:

detecting a radio signal transmitted from a sound transmission device;

extracting feature information of a subject from image data obtained by an image capturing unit;

selecting a sound reception device that receives sound data from at least one sound transmission device from which the radio signal can be received; and receiving, by a wireless communication unit, sound data from the selected sound transmission device, wherein in the selecting, based on a result of comparing feature information of a subject as a shooting target with comparison information for selecting the sound transmission device, the sound transmission device that transmits sound data corresponding to the subject as the shooting target is selected from at least one sound transmission device from which the radio signal can be received; and wherein each sound transmission device that transmits sound data is associated with at least one subject.

20. A non-transitory computer-readable storage medium storing a program for causing a computer to function as an image capture apparatus comprising:

a detection unit that detects a radio signal transmitted from a sound transmission device;

an extraction unit that extracts feature information of a subject from image data obtained by an image capturing unit;

a selection unit that selects a sound reception device that receives sound data from at least one sound transmission device from which the radio signal can be received; and a reception unit that receives, by a wireless communication unit, sound data from the sound transmission device selected by the selection unit, wherein based on a result of comparing feature information of a subject as a shooting target with comparison information for selecting the sound transmission device, the selection unit selects the sound transmission device that transmits sound data corresponding to the subject as the shooting target from at least one sound transmission device from which the radio signal can be received; and wherein each sound transmission device that transmits sound data is associated with at least one subject.

* * * * *